US009684508B2

United States Patent
Oku et al.

(10) Patent No.: US 9,684,508 B2
(45) Date of Patent: Jun. 20, 2017

(54) MOBILE DEVICE AND RECORDING MEDIUM

(71) Applicant: KYOCERA Document Solutions Inc., Osaka (JP)

(72) Inventors: Toyoaki Oku, Osaka (JP); Takeshi Nakamura, Osaka (JP); Ryuichi Ishizu, Osaka (JP); Atsushi Matsumoto, Osaka (JP); Katsuhiro Minoru, Osaka (JP); Daisuke Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/006,704

(22) Filed: Jan. 26, 2016

(65) Prior Publication Data
US 2016/0224333 A1   Aug. 4, 2016

(30) Foreign Application Priority Data
Jan. 30, 2015  (JP) ................. 2015-016559

(51) Int. Cl.
G06F 9/44    (2006.01)
G06F 9/445   (2006.01)

(52) U.S. Cl.
CPC .............. *G06F 8/71* (2013.01); *G06F 8/65* (2013.01); *G06F 8/665* (2013.01); *G06F 8/70* (2013.01); *G06F 8/73* (2013.01)

(58) Field of Classification Search
CPC .............................................. G06F 8/60–8/78
See application file for complete search history.

(56) References Cited

U.S. PATENT DOCUMENTS

| 9,134,994 B2* | 9/2015 | Patel .................. G06F 8/35 |
| 9,513,896 B2* | 12/2016 | Nakamura ............ G06F 8/65 |
| 2008/0216066 A1* | 9/2008 | Oh ..................... G06F 8/68 717/173 |
| 2012/0180034 A1* | 7/2012 | Hatamoto .............. G06F 8/65 717/168 |
| 2013/0227540 A1 | 8/2013 | Ruster et al. |
| 2014/0245278 A1* | 8/2014 | Zellen ................. G06F 8/65 717/170 |

(Continued)

FOREIGN PATENT DOCUMENTS

| JP | 2011-209998 A | 10/2011 |
| JP | 2013-250923 A | 12/2013 |

OTHER PUBLICATIONS

Nilsson, Dennis K. et al., "Secure Firmware Updates over the Air in Intelligent Vehicles," 2008, pp. 380-384.*

(Continued)

*Primary Examiner* — Thuy Dao
*Assistant Examiner* — Christopher Franco
(74) *Attorney, Agent, or Firm* — Studabaker & Brackett PC (57) ABSTRACT

A mobile device receives a latest version of firmware with a firmware management system that manages firmware and receives a current version of firmware in an image forming apparatus through close-range communication with the image forming apparatus. The mobile device determines whether or not a later version than the current version of firmware in the image forming apparatus exists based on the latest version of firmware and the current version of firmware that are received.

3 Claims, 6 Drawing Sheets

(56) References Cited

U.S. PATENT DOCUMENTS

| 2014/0282485 A1* | 9/2014 | Nakamura | G06F 8/65 |
| | | | 717/173 |
| 2014/0331218 A1* | 11/2014 | Kryzer | G06F 8/65 |
| | | | 717/170 |
| 2015/0169312 A1* | 6/2015 | Patel | G06F 8/20 |
| | | | 717/170 |
| 2016/0036956 A1* | 2/2016 | Debates | G06F 8/65 |
| | | | 455/419 |

OTHER PUBLICATIONS

Liu, Leslie et al., "Cloud Service Portal for Mobile Device Management," 2010, pp. 474-478.*
Costa, Laisa C.P. et al., "Over the air download for digital television receivers upgrade," 2010, pp. 261-268.*
Naumowicz, Tomasz et al., "Wireless Sensor Network for Habitat Monitoring on Skomer Island," 2010, pp. 882-889.*
Bjelica, M.Z. et al., "Device Cloud Platform with Script Based Agents for "Anywhere Access" Applications Development," 2014, pp. 1061-1065.*
Maia, Guilherme et al., "Improving an Over-the-Air Programming Protocol for Wireless Sensor Networks Based on Small World Concepts," 2009, pp. 261-267.*
An Office Action; "Notice of Reasons for Rejection," issued by the Japanese Patent Office on Oct. 4, 2016, which corresponds to Japanese Patent Application No. 2015-016559 and is related to U.S. Appl. No. 15/006,704.

* cited by examiner

MOBILE DEVICE AND RECORDING MEDIUM

INCORPORATION BY REFERENCE

The present application claims priority under 35 U.S.C. §119 to Japanese Patent Application No. 2015-016559, filed on Jan. 30, 2015. The contents of this application are incorporated herein by reference in their entirety.

BACKGROUND

The present disclosure relates to a mobile device and a firmware management program for managing apparatus firmware.

Firmware in an apparatus can be rewritten by a known method. More specifically, the apparatus receives a latest version of firmware for the apparatus from a firmware management system that manages firmware. The apparatus updates the firmware in the apparatus to the firmware that the apparatus receives.

SUMMARY

A mobile device according to a first aspect of the present disclosure includes a latest version reception section, a current version reception section, and a latest version determining section. The latest version reception section receives a latest version of firmware with a firmware management system that manages firmware. The current version reception section receives a current version of firmware in an apparatus through close-range communication with the apparatus. The latest version determining section determines whether or not a later version than the current version of firmware in the apparatus exists based on the latest version of firmware received by the latest version reception section and the current version of firmware received by the current version reception section.

A recording medium according to a second aspect of the present disclosure stores a firmware management program that causes a mobile device to function as a mobile device that includes a latest version reception section, a current version reception section, and a latest version determining section. The latest version reception section receives a latest version of firmware with a firmware management system that manages firmware. The current version reception section receives a current version of firmware in an apparatus through close-range communication with the apparatus. The latest version determining section determines whether or not a later version than the current version of firmware in the apparatus exists based on the latest version of firmware received by the latest version reception section and the current version of firmware received by the current version reception section.

DETAILED DESCRIPTION

The following explains an embodiment of the present disclosure with reference to the drawings.

Configuration of a system according to the present embodiment is explained first.

Figure 1:
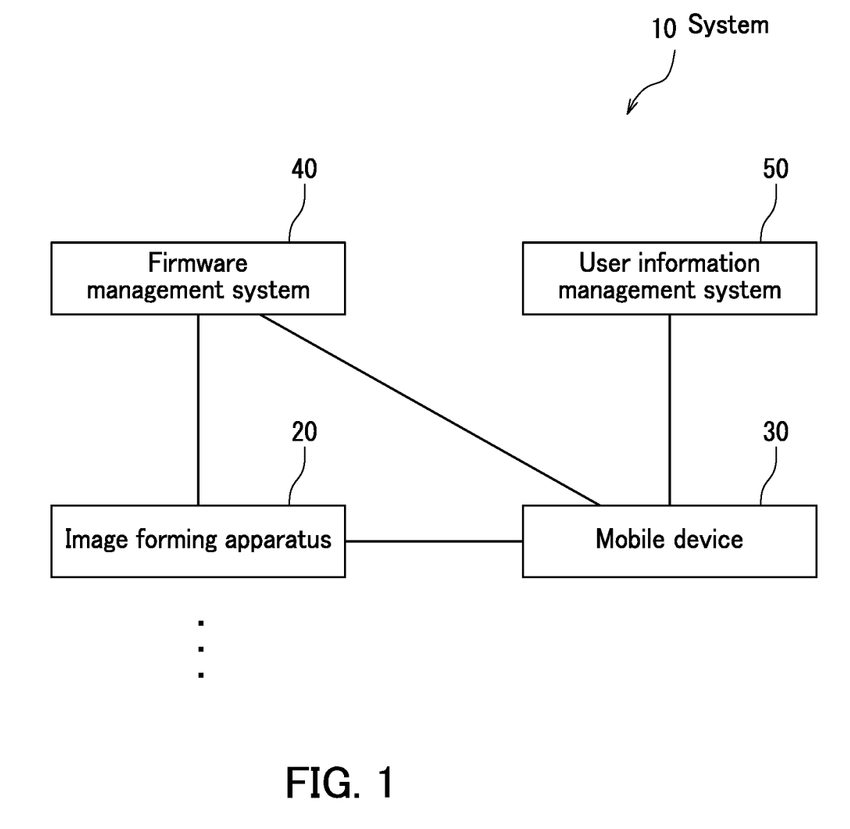
FIG. 1 is a block diagram of a system according to one embodiment of the present disclosure.

FIG. 1 is a block diagram of a system 10 according to the present embodiment.

As illustrated in FIG. 1, the system 10 includes an image forming apparatus 20 as an apparatus, numerous other image forming apparatuses that are the same as the image forming apparatus 20, a mobile device 30, a firmware management system 40, and a user information management system 50. The mobile device 30 rewrites firmware in the image forming apparatuses. The firmware management system 40 manages firmware. The user information management system 50 manages versions of firmware in the image forming apparatuses on a user-by-user basis for users of the image forming apparatuses.

The following explanation uses the image forming apparatus 20 as a representative example of the image forming apparatuses included in the system 10.

The image forming apparatus 20 and the mobile device 30 are connectable to one another through close-range communication. For example, the image forming apparatus 20 and the mobile device 30 are connectable to one another through close-range wireless communication such as Bluetooth (registered Japanese trademark) or wired communication via a universal serial bus (USB) cable or the like.

The image forming apparatus 20 and the firmware management system 40 are for example connectable to one another through a network such as a local area network (LAN) or the Internet.

The mobile device 30 and the firmware management system 40 are for example connectable to one another through a network such as a LAN or the Internet. In the same way, the mobile device 30 and the user information management system 50 are for example connectable to one another through a network such as a LAN or the Internet.

The image forming apparatus 20 is for example an apparatus such as a multifunction peripheral (MFP), a printer, a copier, a fax machine, or a scanner. The image forming apparatus 20 is installed in a user environment. For example, the image forming apparatus 20 is installed in an office of a user of the image forming apparatus 20.

The mobile device 30 is a device such as a smartphone or a tablet computer. The mobile device 30 is for example carried by a service person who works for a provider of the image forming apparatus 20.

The firmware management system 40 is for example formed by one or more computers such as personal computers (PCs). The firmware management system 40 is for example managed by the provider of the image forming apparatus 20.

In the same way, the user information management system 50 is for example formed by one or more computers such as PCs. The user information management system 50 is for example managed by the provider of the image forming apparatus 20.

The firmware management system 40 and the user information management system 50 may be formed by the same computer.

Figure 2:
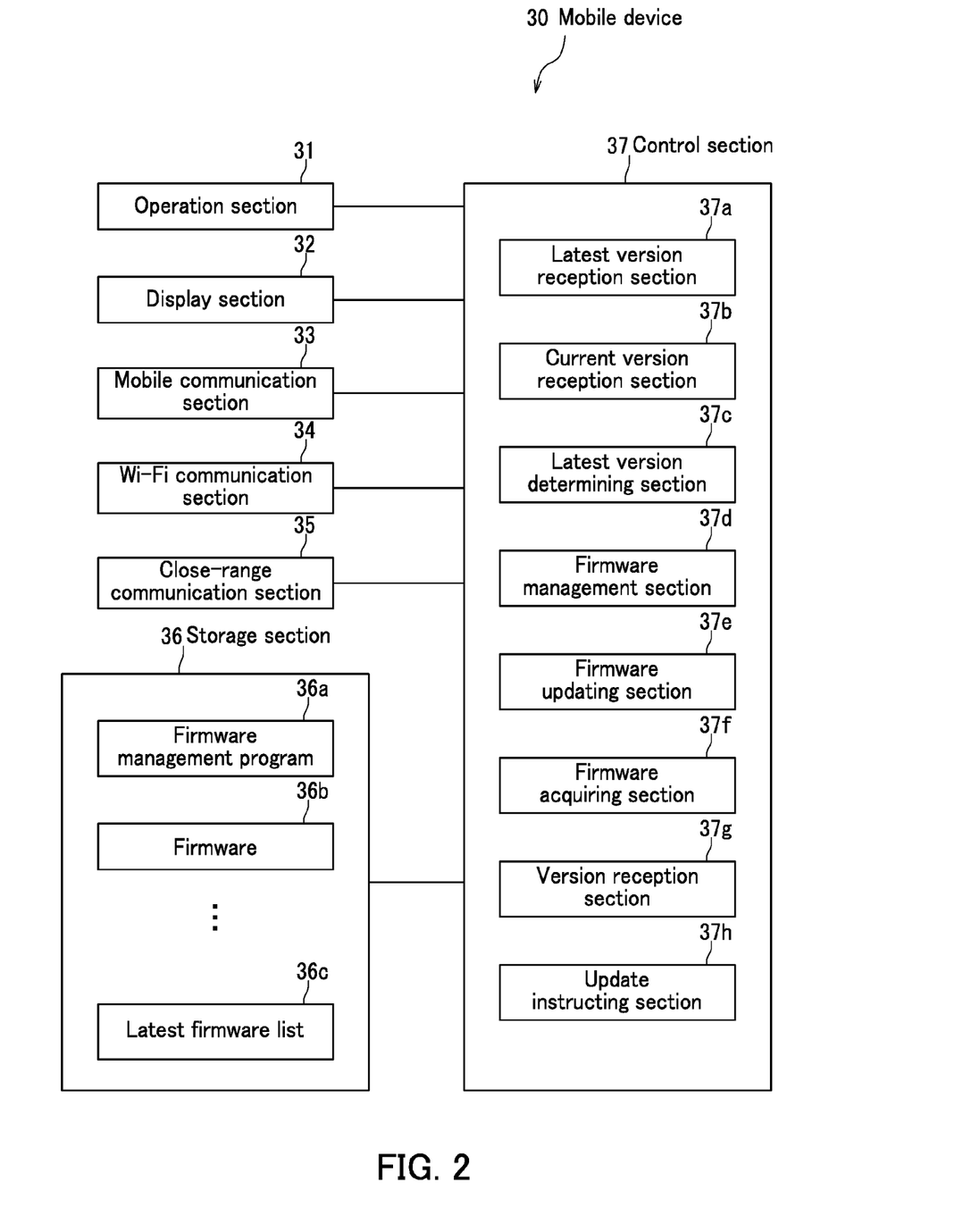
FIG. 2 is a block diagram of a mobile device illustrated in FIG. 1.

FIG. 2 is a block diagram of the mobile device 30.

As illustrated in FIG. 2, the mobile device 30 includes an operation section 31, a display section 32, a mobile communication section 33, a Wi-Fi communication section 34, a close-range communication section 35, a storage section 36, and a control section 37. The operation section 31 is an input device through which various operations are input, such as one or more buttons. The display section 32 is a display device that displays various information, such as a liquid-crystal display (LCD). The mobile communication section 33 is a communication device that performs communication with an external device through a mobile communication system such as a third generation mobile communication system (3G) or a fourth generation mobile communication system (4G). The Wi-Fi communication section 34 is a communication device that performs communication with an external device through Wi-Fi (Wireless Fidelity). The close-range communication section 35 is a communication device that performs communication with an external device through close-range communication such as close-range wireless communication or wired communication. The storage section 36 is a storage device that stores various data, such as electrically erasable programmable read only memory (EEPROM) or a hard disk drive (HDD). The control section 37 performs overall control of the mobile device 30.

The storage section 36 stores a firmware management program 36a for managing firmware. The firmware management program 36a may be installed in the mobile device 30 during manufacture of the mobile device 30. Alternatively, the firmware management program 36a may be subsequently installed in the mobile device 30 from a storage medium such as an SD card or a USB memory. Further alternatively, the firmware management program 36a may be subsequently installed in the mobile device 30 through a network.

The storage section 36 can store a plurality of items of firmware 36b and a latest firmware list 36c that lists latest firmware.

The control section 37 for example includes a central processing unit (CPU), read only memory (ROM) that stores programs and various data, and random access memory (RAM) that is used as a work area by the CPU. The CPU executes a program stored in the ROM or the storage section 36.

The control section 37 functions as a latest version reception section 37a, a current version reception section 37b, a latest version determining section 37c, a firmware management section 37d, a firmware updating section 37e, a firmware acquiring section 37f, a version reception section 37g, and an update instructing section 37h. The latest version reception section 37a receives a latest version of firmware with the firmware management system 40 by executing the firmware management program 36a stored by the storage section 36. The current version reception section 37b receives a current version of firmware in an image forming apparatus through close-range communication with the image forming apparatus. The latest version determining section 37c determines whether or not a later version than a current version of firmware in an image forming apparatus exists. The firmware management section 37d manages firmware. The firmware updating section 37e updates firmware in an image forming apparatus to a latest version of firmware. The firmware acquiring section 37f acquires firmware from the firmware management system 40. The version reception section 37g receives a version of firmware in an image forming apparatus of a user with the user information management system 50 (refer to FIG. 1). The update instructing section 37h instructs the firmware management system 40 to update firmware in an image forming apparatus to a latest version of firmware.

The following explains operation of the system 10.

First, operation of the mobile device 30 is explained for a situation in which the mobile device 30 acquires a latest version of firmware from the firmware management system 40.

Figure 3:
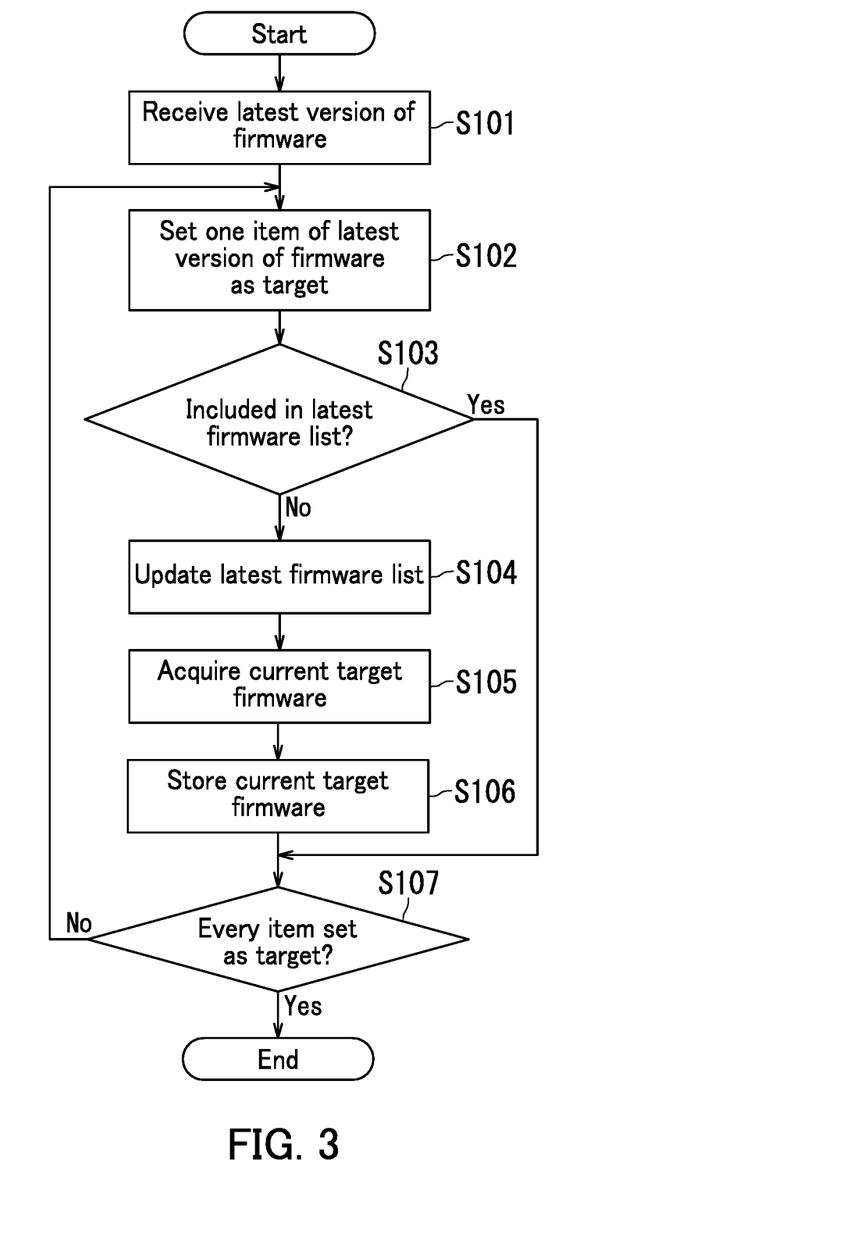
FIG. 3 is a flowchart illustrating operation of the mobile device illustrated in FIG. 2 in a situation in which the mobile device acquires a latest version of firmware from a firmware management system.

FIG. 3 is a flowchart illustrating operation of the mobile device 30 in a situation in which the mobile device 30 acquires a latest version of firmware from the firmware management system 40.

The mobile device 30 periodically performs the operation illustrated in FIG. 3.

As illustrated in FIG. 3, the latest version reception section 37a of the mobile device 30 receives a latest version of firmware with the firmware management system 40 through the Wi-Fi communication section 34 (S101).

Next, the firmware management section 37d sets one item of the latest version of firmware received in S101 as a target (S102).

Next, the firmware management section 37d determines whether or not the current target firmware is included in the latest firmware list 36c (S103).

When the firmware management section 37d determines in S103 that the current target firmware is not included in the latest firmware list 36c, the firmware management section 37d updates the latest firmware list 36c according to the current target firmware (S104).

Next, the firmware acquiring section 37f acquires the current target firmware from the firmware management system 40 through the Wi-Fi communication section 34 (S105).

Next, the firmware management section 37d causes the storage section 36 to store the firmware acquired in S105 as an item of firmware 36b (S106).

When the firmware management section 37d determines in S103 that the current target firmware is included in the latest firmware list 36c or when processing in S106 ends, the firmware management section 37d determines whether or not every item of the latest version of firmware received in S101 has been set as a target (S107).

When the firmware management section 37d determines in S107 that any item of the latest version of firmware has not yet been set as a target, the firmware management section 37d performs processing in S102 for the item of firmware that has not yet been set as a target.

When the firmware management section 37d determines in S107 that every item of the latest version of firmware has been set as a target, the operation illustrated in FIG. 3 ends.

Note that in the operation described above, the latest version reception section 37a receives a latest version of firmware through the Wi-Fi communication section 34. However, in a situation in which, for example, communication through the Wi-Fi communication section 34 is not possible, the latest version reception section 37a may receive a latest version of firmware through the mobile communication section 33. In the same way, the firmware acquiring section 37*f* acquires firmware through the Wi-Fi communication section 34 in the operation described above. However, in a situation in which, for example, communication through the Wi-Fi communication section 34 is not possible, the firmware acquiring section 37*f* may acquire firmware through the mobile communication section 33.

In the operation described above, items of firmware for all apparatus models managed by the firmware management system 40 are set as targets. However, the mobile device 30 may prioritize, as a target, an item of firmware for an apparatus model used by a user that the service person is scheduled to visit.

Figure 4:
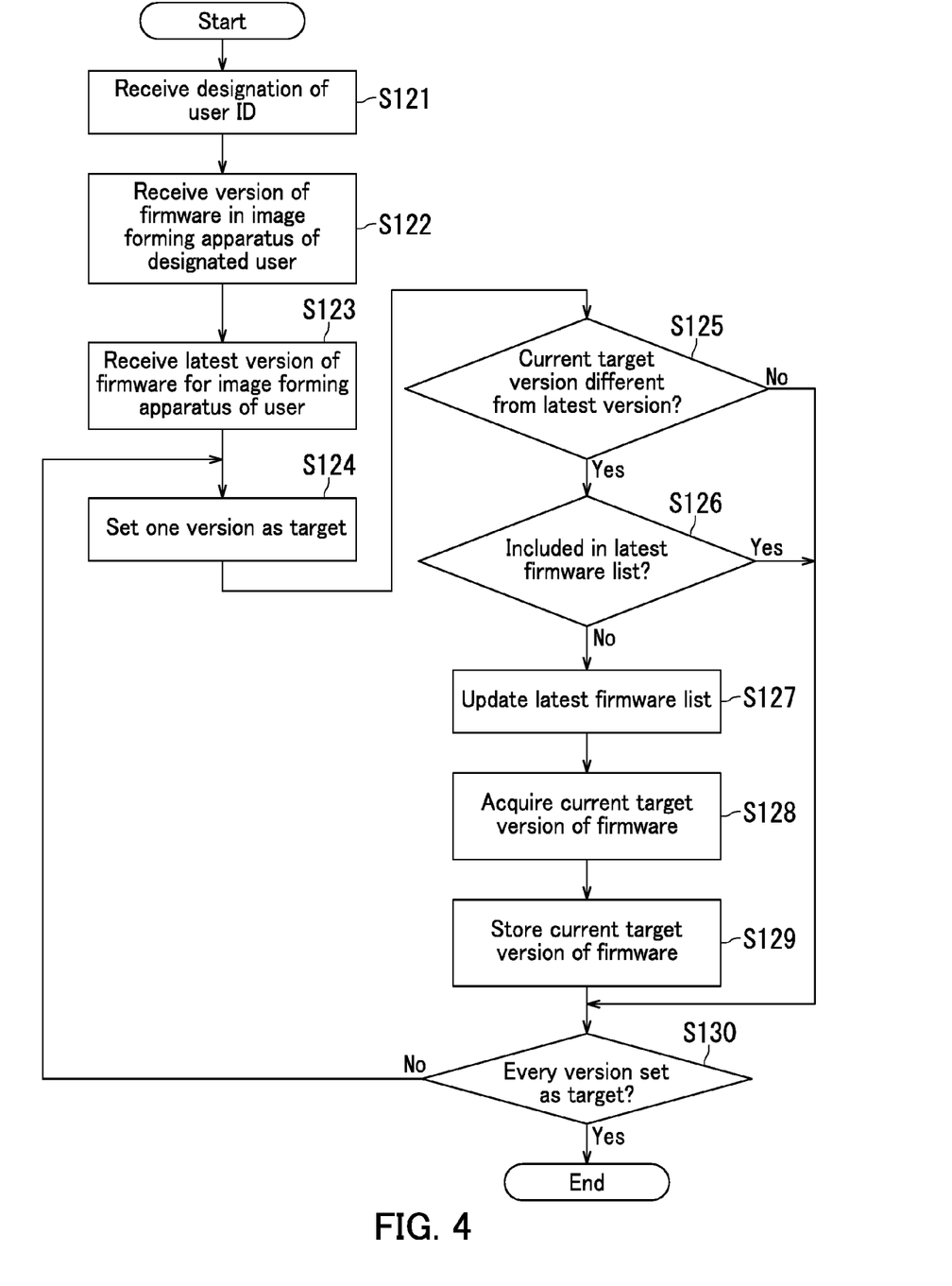
FIG. 4 is a flowchart illustrating operation of the mobile device illustrated in FIG. 2 in a situation in which the mobile device acquires a latest version of firmware from the firmware management system for an apparatus model used by a user.

FIG. 4 is a flowchart illustrating operation of the mobile device 30 in a situation in which the mobile device 30 acquires a latest version of firmware from the firmware management system 40 for an apparatus model used by a user.

In a situation in which the mobile device 30 performs the operation illustrated in FIG. 4 instead of the operation illustrated in FIG. 3, the mobile device 30 performs the operation illustrated in FIG. 4 when reception of a version of firmware in an image forming apparatus is instructed through the operation section 31.

As illustrated in FIG. 4, the version reception section 37*g* of the mobile device 30 receives a designation of an ID of a user of an image forming apparatus through the operation section 31 (S121). In the present example, the service person who uses the mobile device 30 can input an ID through the operation section 31 for a user that the service person is scheduled to visit.

Next, the version reception section 37*g* receives, with the user information management system 50, a version of firmware in the image forming apparatus used by the user designated in S121, through the Wi-Fi communication section 34 (S122).

Next, the latest version reception section 37*a* receives, with the firmware management system 40 through the Wi-Fi communication section 34, a latest version of firmware for which reception in S122 was performed (S123).

Next, the firmware management section 37*d* sets one version of firmware received in S122 as a target (S124).

Next, the firmware management section 37*d* determines whether or not the version set as a target in S124—that is, a current target version—is different from the latest version of firmware received in S123 (S125). In the present example, the version of firmware received in S122 is a latest version in a situation in which the version of firmware received in S122 is the same as the latest version of firmware received in S123.

When the firmware management section 37*d* determines in S125 that the current target version is different from the latest version of firmware received in S123, the firmware management section 37*d* determines whether or not the current target version of firmware is included in the latest firmware list 36*c* (S126).

When the firmware management section 37*d* determines in S126 that the current target version of firmware is not included in the latest firmware list 36*c*, the firmware management section 37*d* updates the latest firmware list 36*c* according to the current target version of firmware (S127).

Next, the firmware acquiring section 37*f* acquires the current target version of firmware from the firmware management system 40 through the Wi-Fi communication section 34 (S128).

Next, the firmware management section 37*d* causes the storage section 36 to store the firmware acquired in S128 as an item of firmware 36*b* (S129).

When the firmware management section 37*d* determines in S125 that the current target version is not different from the latest version of firmware acquired in S123 or determines in S126 that the current target version of firmware is included in the latest firmware list 36*c*, once processing in S129 ends, the firmware management section 37*d* determines whether or not every version of firmware received in S122 has been set as a target (S130).

When the firmware management section 37*d* determines in S130 that any version of firmware received in S122 has not yet been set as a target, the firmware management section 37*d* performs processing in S124 for the version that has not yet been set as a target.

When the firmware management section 37*d* determines in S130 that every version of firmware received in S122 has been set as a target, the operation illustrated in FIG. 4 ends.

Through the operation illustrated in FIG. 4, the service person who uses the mobile device 30 can for example input an ID of a user that the service person is scheduled to visit the next day through the operation section 31, before going to sleep in the evening. Consequently, necessary firmware can be acquired by the mobile device 30 while the service person is sleeping.

In the operation described above, the version reception section 37*g* receives a version of firmware in a user's image forming apparatus through the Wi-Fi communication section 34. However, in a situation in which, for example, communication through the Wi-Fi communication section 34 is not possible, the version reception section 37*g* may receive a version of firmware in a user's image forming apparatus through the mobile communication section 33. In the same way, the latest version reception section 37*a* receives a latest version of firmware through the Wi-Fi communication section 34 in the operation described above. However, in a situation in which, for example, communication through the Wi-Fi communication section 34 is not possible, the latest version reception section 37*a* may receive a latest version of firmware through the mobile communication section 33. In the same way, the firmware acquiring section 37*f* acquires firmware through the Wi-Fi communication section 34 in the operation described above. However, in a situation in which, for example, communication through the Wi-Fi communication section 34 is not possible, the firmware acquiring section 37*f* may acquire firmware through the mobile communication section 33.

The following explains operation of the mobile device 30 in a situation in which the mobile device 30 updates firmware in an image forming apparatus to a latest version of firmware.

Figure 5:
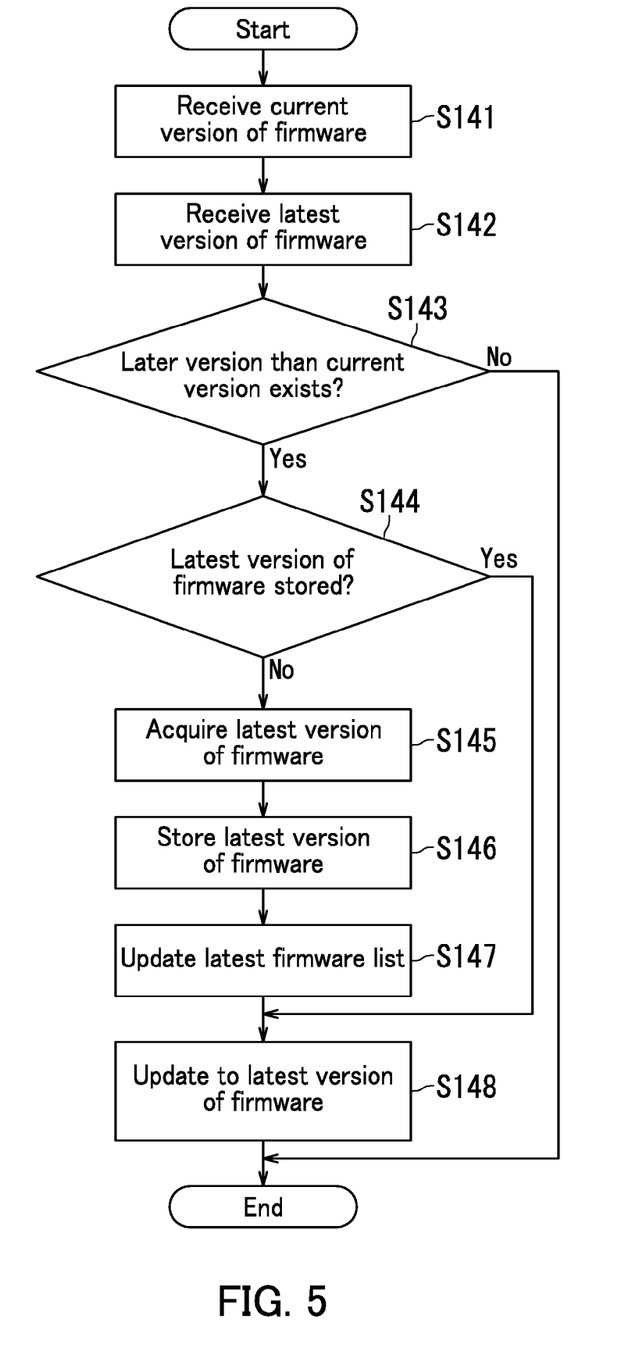
FIG. 5 is a flowchart illustrating operation of the mobile device illustrated in FIG. 2 in a situation in which the mobile device updates firmware in an image forming apparatus to a latest version of firmware.

FIG. 5 is a flowchart illustrating operation of the mobile device 30 in a situation in which the mobile device 30 updates firmware in an image forming apparatus to a latest version of firmware.

The service person who uses the mobile device 30 instructs the mobile device 30 to perform the operation illustrated in FIG. 5 through the operation section 31 when the service person visits a user of an image forming apparatus.

As illustrated in FIG. 5, the current version reception section 37*b* receives, with the image forming apparatus through the close-range communication section 35, a current version of firmware in the image forming apparatus (S141).

Next, the latest version reception section 37*a* receives a latest version of firmware with the firmware management system 40 through the Wi-Fi communication section 34 (S142). In the present example, the latest version reception section 37a may only receive the latest version in S142 for an item of firmware for which the current version is received in S141.

Next, the latest version determining section 37c determines whether or not a later version than the current version of firmware in the image forming apparatus exists based on the current version of firmware received in S141 and the latest version of firmware received in S142 (S143).

When a later version than the current version of firmware in the image forming apparatus is determined to exist in S143, the firmware updating section 37e determines whether or not the latest version of firmware received in S142 is stored by the storage section 36 (S144).

When it is determined in S144 that the latest version of firmware is not stored by the storage section 36, the firmware acquiring section 37f acquires the latest version of firmware received in S142 from the firmware management system 40, through the Wi-Fi communication section 34 (S145).

Next, the firmware management section 37d causes the storage section 36 to store the firmware acquired in S145 as an item of firmware 36b (S146) and updates the latest firmware list 36c according to the firmware acquired in S145 (S147).

When it is determined in S144 that the latest version of firmware is stored by the storage section 36 or when processing in S147 ends, the firmware updating section 37e performs processing in S148. More specifically, the firmware updating section 37e updates the firmware in the image forming apparatus, through the close-range communication section 35, to the latest version of firmware that is received in S142 and that is stored by the storage section 36 (S148).

When it is determined in S143 that a later version than the current version of firmware in the image forming apparatus does not exist or when processing in S148 ends, the control section 37 ends the operation illustrated in FIG. 5.

Note that in the operation described above, the latest version reception section 37a receives a latest version of firmware through the Wi-Fi communication section 34. However, in a situation in which, for example, communication through the Wi-Fi communication section 34 is not possible, the latest version reception section 37a may receive a latest version of firmware through the mobile communication section 33. In the same way, the firmware acquiring section 37f acquires firmware through the Wi-Fi communication section 34 in the operation described above. However, in a situation in which, for example, communication through the Wi-Fi communication section 34 is not possible, the firmware acquiring section 37f may acquire firmware through the mobile communication section 33.

Figure 6:
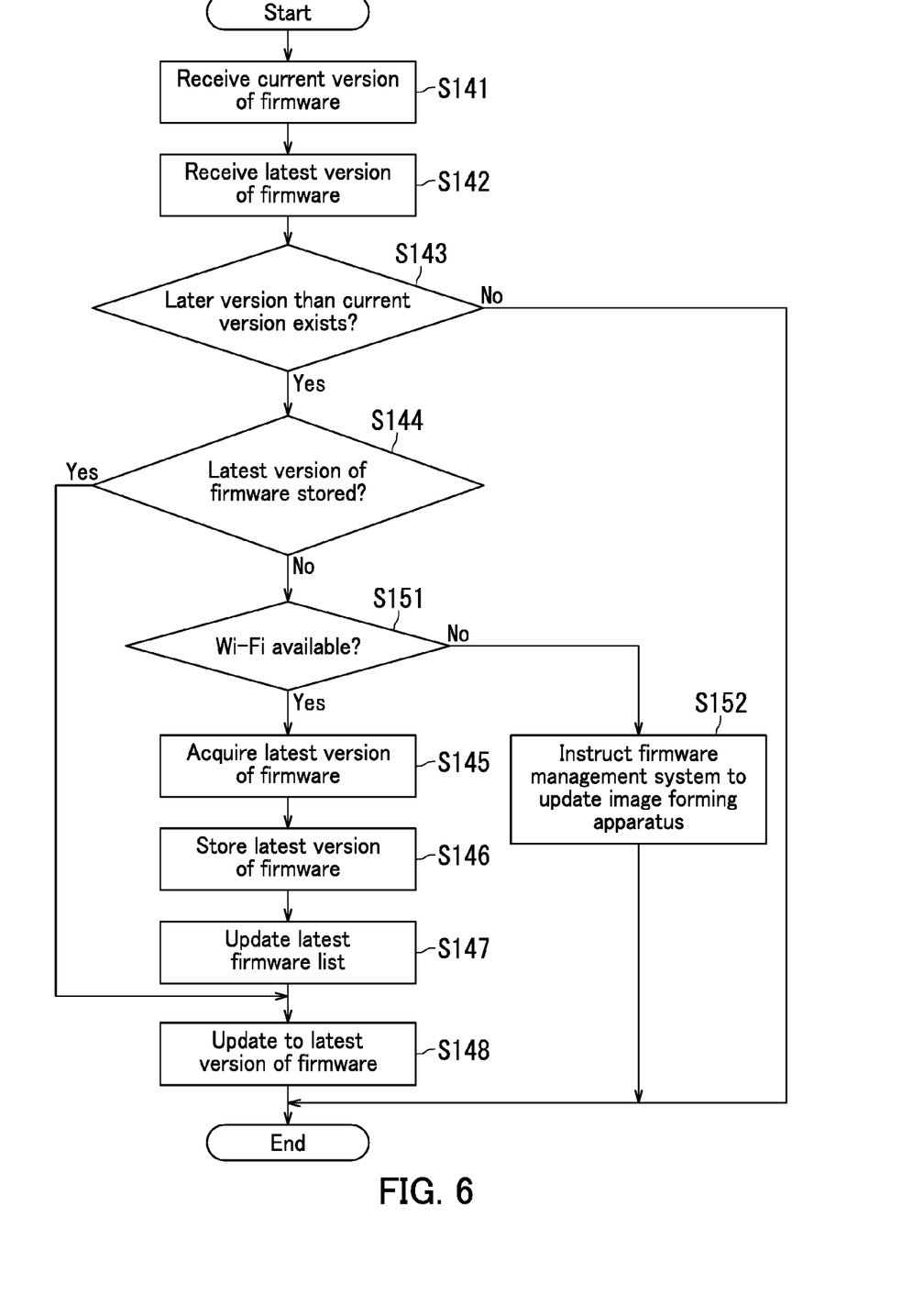
FIG. 6 is a flowchart illustrating operation of the mobile device illustrated in FIG. 2 in a situation in which the mobile device updates firmware in an image forming apparatus to a latest version of firmware and illustrates a different example to the example illustrated in FIG. 5.

The mobile device 30 may perform an operation illustrated in FIG. 6 instead of the operation illustrated in FIG. 5. However, a precondition for the operation illustrated in FIG. 6 is that communication between a target image forming apparatus and the firmware management system 40 is possible.

FIG. 6 is a flowchart illustrating operation of the mobile device 30 in a situation in which the mobile device 30 updates firmware in an image forming apparatus to a latest version of firmware; FIG. 6 illustrates a different example to the example illustrated in FIG. 5.

As illustrated in FIG. 6, when it is determined in S144 that a latest version of firmware is not stored by the storage section 36, the update instructing section 37h determines whether or not communication between the mobile device 30 and the firmware management system 40 is through Wi-Fi (S151).

When it is determined in S151 that communication between the mobile device 30 and the firmware management system 40 is through Wi-Fi, the firmware acquiring section 37f acquires, through the Wi-Fi communication section 34a, a latest version of firmware received with the firmware management system 40 in S142 (S145). It should be noted that in processing in S145 of the operation illustrated in FIG. 6, the firmware acquiring section 37f does not acquire firmware through the mobile communication section 33.

When the update instructing section 37h determines in S151 that communication between the mobile device 30 and the firmware management system 40 is not through Wi-Fi, the update instructing section 37h instructs the firmware management system 40 to update firmware in the image forming apparatus to the latest version of firmware received in S142 (S152). In other words, the firmware acquiring section 37f stops acquisition, from the firmware management system 40, of the latest version of firmware received in S142. The instruction in S152 indicates the latest version received in S142 and identification information for a target image forming apparatus that is to be updated. Therefore, the latest version of firmware received in S142 is downloaded from the firmware management system 40 by the target image forming apparatus and used to update the target image forming apparatus, only through transfer between the target image forming apparatus and the firmware management system 40.

The control section 37 ends the operation illustrated in FIG. 6 upon processing in S152 ending.

In the operations illustrated in FIGS. 5 and 6, processing in S141 and processing in S142 may be performed in the opposite order.

Furthermore, the latest firmware list 36c is updated in the operations illustrated in FIGS. 3 and 4. Therefore, in the operations illustrated in FIGS. 5 and 6, the latest version of firmware may be received with the latest firmware list 36c in processing in S143 without performing processing in S142.

As explained above, the mobile device 30 determines whether or not a later version than a current version of firmware in the image forming apparatus 20 exists based on a latest version of firmware received with the firmware management system 40 and the current version of the firmware in the image forming apparatus 20, which is received through close-range communication with the image forming apparatus 20 (S143). Therefore, firmware in the image forming apparatus 20 can be maintained as a latest version even in a situation in which communication between the image forming apparatus 20 and the firmware management system 40 cannot be performed to receive a version of firmware.

The mobile device 30 manages firmware for the image forming apparatus 20 (S106, S129, or S146). Therefore, in a situation in which the mobile device 30 is managing a latest version of firmware for the image forming apparatus 20, the mobile device 30 can update firmware in the image forming apparatus 20 to the latest version of firmware even when communication between the image forming apparatus 20 and the firmware management system 40 cannot be performed.

The mobile device 30 acquires firmware from the firmware management system 40 (S105, S128, or S145). Therefore, even in a situation in which the mobile device 30 is not yet managing a latest version of firmware for the image forming apparatus 20, the mobile device 30 can manage the latest version of firmware for the image forming apparatus 20 by acquiring the latest version of firmware from the firmware management system 40.

The mobile device 30 acquires a latest version of firmware for the image forming apparatus 20 of the user (S128). Therefore, the mobile device 30 can manage firmware more selectively. As a consequence, the mobile device 30 can manage firmware efficiently even in a situation in which, for example, the storage section 36 has limited storage capacity.

When communication between the mobile device 30 and the firmware management system 40 is not through Wi-Fi (S151: No), the mobile device 30 can cause firmware in the image forming apparatus 20 to be updated to a latest version of firmware through the firmware management system 40 (S152) even if the mobile device 30 is not managing the latest version of firmware (S144: No). In such a situation, acquisition by the mobile device 30 of the latest version of firmware for the image forming apparatus 20 from the firmware management system 40 (S145) is not performed. Therefore, compared to a configuration in which the mobile device 30 acquires the latest version of firmware for the image forming apparatus 20 from the firmware management system 40 through a mobile communication system, the present configuration can inhibit a reduction in processing speed occurring when the mobile device 30 updates firmware in the image forming apparatus 20 to the latest version of firmware. Furthermore, if the mobile device 30 acquires the latest version of firmware for the image forming apparatus 20 from the firmware management system 40 through a mobile communication system, it is possible that use of the mobile communication system to acquire firmware may incur a fee. However, in a situation in which the firmware management system 40 updates the firmware in the image forming apparatus 20 to the latest version of firmware without the mobile device 30 acquiring the latest version of firmware for the image forming apparatus 20 from the firmware management system 40, incurrence of a fee for firmware acquisition can be avoided.

Note that the mobile device 30 automatically updates firmware in the operations illustrated in FIGS. 5 and 6. However, updating of firmware by the mobile device 30 may alternatively not be automatic. For example, the mobile device 30 may simply display a result of the determination in S143 on the display section 32. When the result of the determination in S143 is displayed on the display section 32, the user of the mobile device 30 may check displayed content of the display section 32 and may input an instruction through the operation section 31 for updating firmware in the image forming apparatus 20. Furthermore, the user of the mobile device 30 may alternatively update firmware in the image forming apparatus 20 using a device such as a USB memory that stores a latest version of firmware for the image forming apparatus 20.

In a situation in which updating of firmware in the image forming apparatus 20 is not performed from the mobile device 30 to the image forming apparatus 20, the mobile device 30 does not need to acquire firmware from the firmware management system 40 in the operations illustrated in FIGS. 3-6. Furthermore, even in a situation in which updating of firmware in the image forming apparatus 20 is performed by the mobile device 30, the mobile device 30 does not need to acquire firmware from the firmware management system 40 in the operations illustrated in FIGS. 3 and 4 in a configuration in which firmware is acquired from the firmware management system 40 in the operations illustrated in FIGS. 5 and 6.

Although the "apparatus" of the present disclosure is explained as an image forming apparatus in the present embodiment, the "apparatus" may be a different type of apparatus such as a PC.

What is claimed is:

1. A mobile device comprising:
an input device;
a CPU; and
a storage that stores therein a firmware management program, wherein
the mobile device is connected to an image forming apparatus through close-range communication,
the image forming apparatus is connected through a network to a firmware management system that manages firmware,
the mobile device is connected through the network to both the firmware management system and a user information management system that manages versions of firmware in users' image forming apparatus on a user-by-user basis,
the CPU is configured to
 execute the firmware management program,
 receive a designation of an ID of a user of the image forming apparatus through the input device,
 acquire a version of firmware in the image forming apparatus used by the user designated according to the ID from the user information management system,
 acquire a latest version of the firmware in the image forming apparatus used by the user designated according to the ID from the firmware management system, and
 acquire the firmware in the latest version when the firmware in the latest version is not managed by the CPU in a situation in which the version acquired from the user information management system is different from the latest version acquired from the firmware management system, and
the CPU is further configured, for update of the firmware in the image forming apparatus, to
 acquire a current version of the firmware in the image forming apparatus through the close-range communication with the image forming apparatus,
 acquire from the firmware management system the latest version of the firmware in the image forming apparatus used by the user designated according to the ID,
 determine whether or not a later version than the current version of the firmware in the image forming apparatus exists based on the acquired latest version and the acquired current version,
 when the later version than the current version of the firmware in the image forming apparatus is determined to exist, determine whether or not the firmware in the acquired latest version is stored in the storage,
 when it is determined that the firmware in the acquired latest version is stored in the storage, update the firmware in the image forming apparatus to the firmware in the latest version stored in the storage,
 in a situation in which the mobile device is connected to the firmware management system through Wi-Fi when it is determined that the firmware in the acquired latest version is not stored in the storage, acquire the firmware in the latest version from the firmware management system and update the firmware in the image forming apparatus to the firmware in the latest version, and in a situation in which the mobile device is not connected to the firmware management system through the Wi-Fi when it is determined that the firmware in the acquired latest version is not stored in the storage, stop acquisition of the firmware in the latest version and provides to the firmware management system an instruction to update the firmware in the image forming apparatus to the firmware in the latest version.

2. The mobile device according to claim 1, wherein the instruction to update the firmware in the image forming apparatus that is provided to the firmware management system includes the acquired latest version and identification information for the target image forming apparatus that is to be updated.

3. The mobile device according to claim 1, wherein the storage stores therein a latest firmware list that lists latest firmware, and the CPU updates the latest firmware list according to the acquired latest version.

* * * * *